Sept. 2, 1941. A. M. BROWN 2,254,792
VESSEL WELDING METHOD AND APPARATUS
Filed Sept. 16, 1938 2 Sheets-Sheet 2
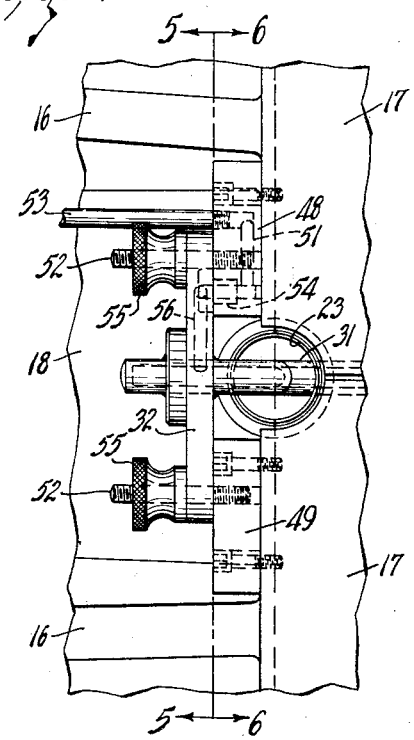
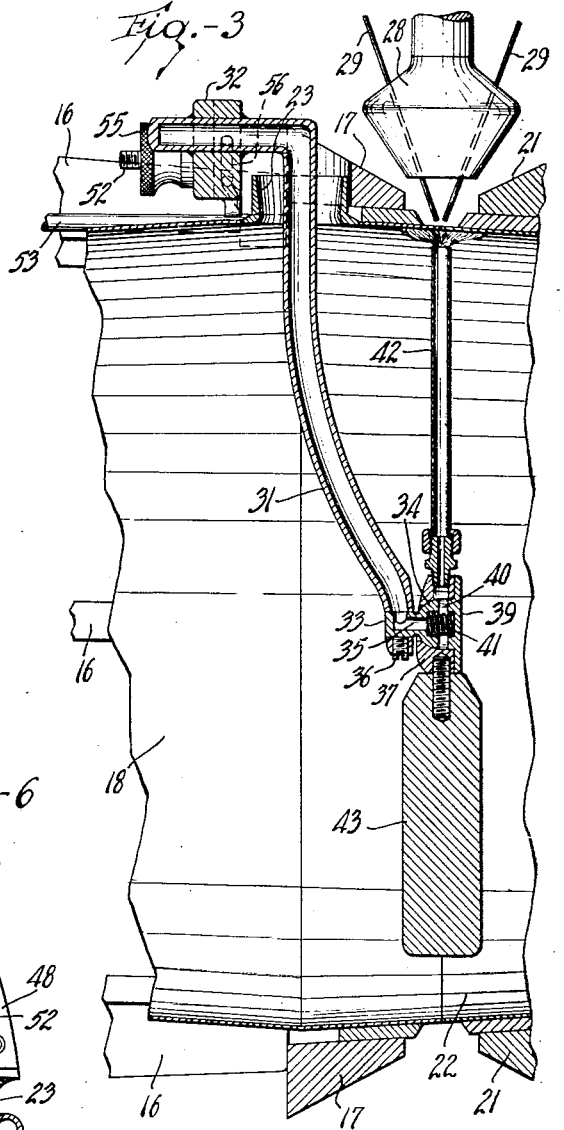
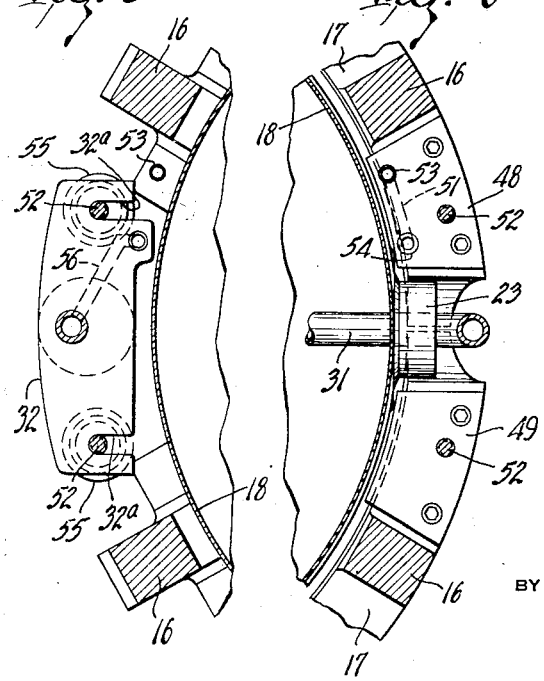
INVENTOR
ARCHIBALD M. BROWN
BY
ATTORNEYS Patented Sept. 2, 1941

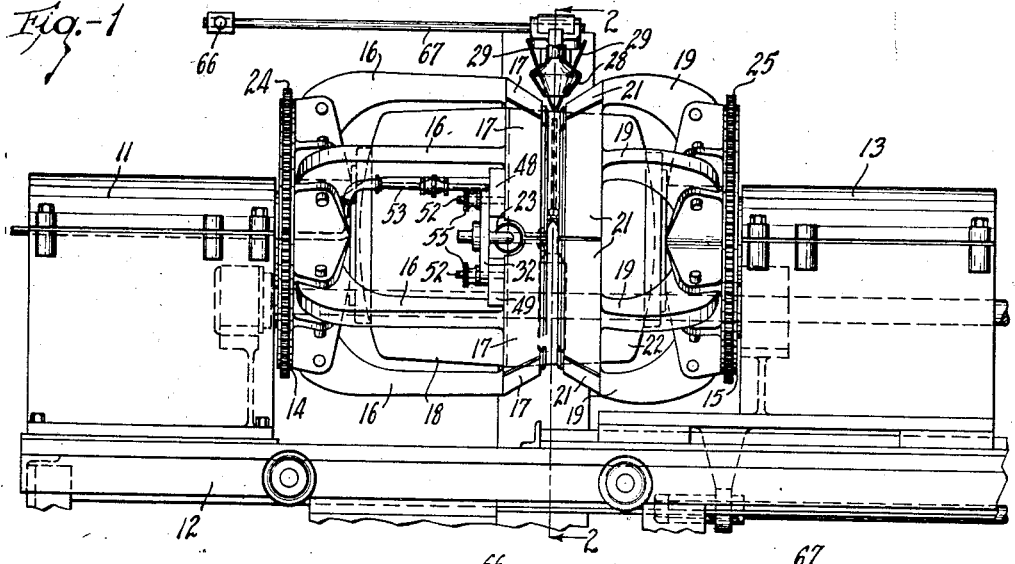
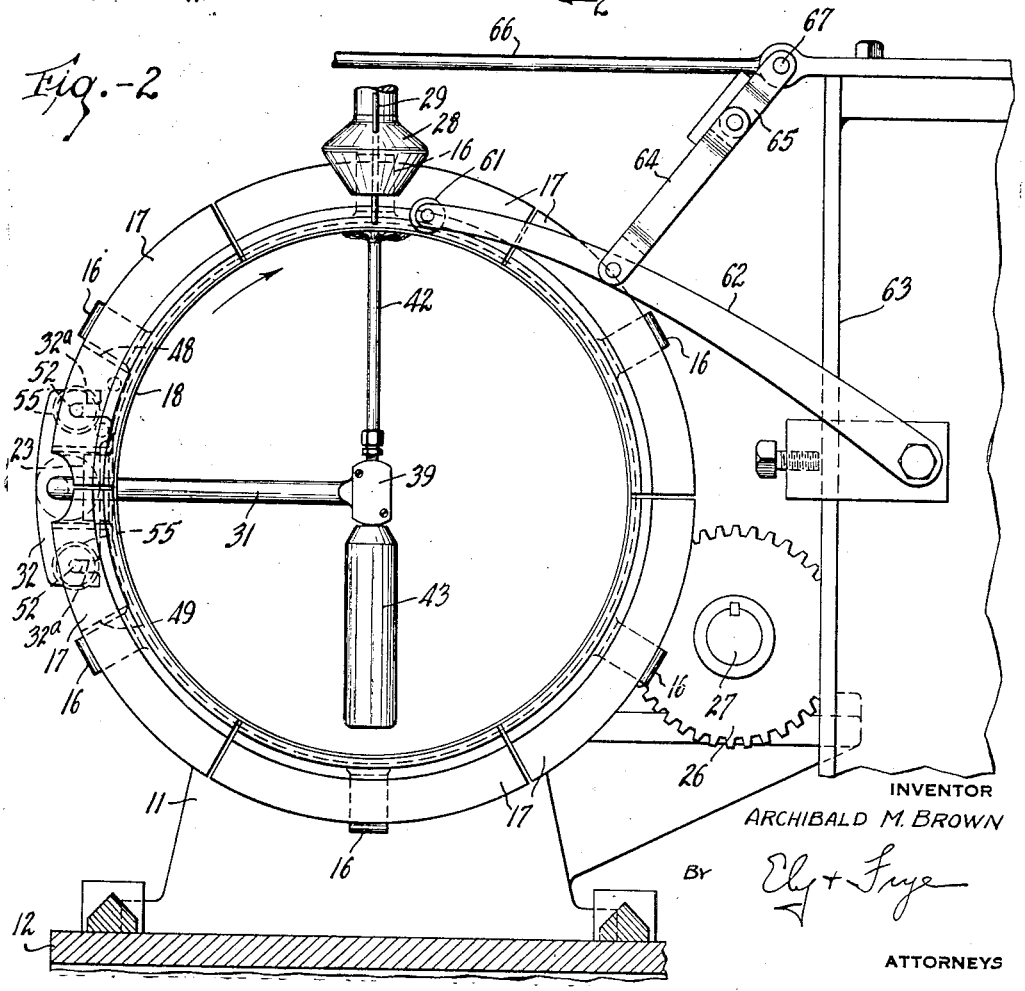

2,254,792

UNITED STATES PATENT OFFICE 2,254,792

VESSEL WELDING METHOD AND APPARATUS

Archibald M. Brown, Akron, Ohio, assignor to The Firestone Tire & Rubber Company, Akron, Ohio, a corporation of Ohio Application September 16, 1938, Serial No. 230,240

8 Claims. (Cl. 113—59)

This invention relates to welding methods and apparatus, more especially to improved procedure and apparatus for welding together two cup-like structures that together constitute a hollow, closed vessel.

The invention is of primary utility in the manufacture of metal barrels which have inner shells or linings that are composed of corrosion-resisting material, such as stainless steel. Barrel linings of this type are made in two sections, each of which is a one-piece, drawn metal structure, the sections being united by a circumferential seam. Union of the two sections is effected by the process known as atomic welding, which consists in fusing together the abutting margins of barrel lining sections without the addition of any bonding material thereto.

The chief objects of the invention are to provide improved procedure and apparatus for use in welding together sections forming closed vessels of the foregoing character; to reduce appreciably the loss and waste due to defective structures formed by this welding operation; to form vessels which are adapted to contain foodstuffs; to reduce scale and oxide formation in the welding operation to a minimum; and to provide uniformity of product. Other objects will be manifest from the specification.

Broadly speaking, the present invention comprises providing means for mounting two cup-like sections, one of which has a hole therethrough, in abutting relationship and associating welding means with one portion of the abutted surfaces. Tubular means are provided for insertion into the closed metallic vessel through the hole therein, and these tubular means mount a burner, or nozzle which has weights associated therewith to retain it in a fixed, vertical position. The burner is positioned within the vessel in the plane of the abutted surfaces of the cup-like sections by the tubular means. Then an inert, or reducing gas, is supplied to the burner whereby the inner surface of the closed vessel can be subjected to a reducing, or non-oxidizing atmosphere, while the sections of the vessel are being fused together. This reduces, or substantially eliminates, oxidation of the fused surface, thereby aiding in obtaining a tight, uniform fused seam.

In the accompanying drawings:

Figure 1 is an elevation of apparatus for practicing the invention;

Figure 2 is a vertical section on line 2—2 of Figure 1 before the vessel sections are fused together;

Figure 3 is an enlarged section of the burner mechanism inserted into the closed metallic vessel;

Figure 4 is a plan view of a portion of the apparatus of Figure 3; and

Figures 5 and 6 are transverse sections on lines 5—5 and 6—6 of Figure 4.

Referring more specifically to Figure 1 of the drawings, a stationary housing 11 is supported by a frame 12 that also mounts a movable housing 13 that is movable toward and away from the stationary housing 11. A rotatable head 14 is journalled in the stationary housing 11 and a similar rotatable head 15 is journalled in the movable housing 13. The head 14 carries an annular series of arms 16 that extend towards the head 14, with the free ends of the arms being formed with transversely arcuate pads 17 thereon. These arms 16 are disposed concentrically with relation to the axis of the head 14 and are adapted to engage with and support a semi-container section, such as a barrel lining section 18. Figure 1 indicates that the pads 17 are in substantially end to end relation on the lining section 18 and that the pads engage the lining section close to, but somewhat spaced from, the margin, or open end of the section. Similarly, the head 15 carries arms 19 which have end pads 21 formed thereon to engage and support a lining section 22. It will be observed that the lining section 22 and the arms 19 are somewhat shorter than the lining section 18 and the arms 16, also that a bung hole 23 is formed in the lining section 18. In order to rotate the heads 14 and 15, they are provided with ring gears 24 and 25 respectively, which gears mesh with corresponding pinion gears, such as the pinion 26 (Figure 2) that is mounted upon a shaft 27 driven by any suitable means (not shown). Thus the heads 14 and 15 and the lining sections 18 and 22, which are carried in abutted relationship, can be rotated in unison in the direction indicated in Figure 2, when desired. This rotation is on the axis of the lining sections and is normal to the plane of the circumferential joint formed by the abutted lining sections.

A stationary atomic welding head 28 is adjustably positioned adjacent the abutted ends of the lining sections. Electrodes 29 are carried by the welding head 28 and are provided with electrical energy to produce the desired welding, or fusing, arc immediately adjacent the abutted lining sections. Sealing the lining sections together is a progressive operation which occurs only at the welding head so that the lining sections are slowly rotated relative to the welding head until a complete revolution has been made in order to seal the sections together.

Oxidation of the heated ends of the lining sections and scale formation on the inner surface of the lining sections is retarded, or substantially limited, by fusing in a non-oxidizing atmosphere. That is, nitrogen, hydrogen, or other non-oxidizing, or inert, gas is supplied to the portion of the inner surface of the abutted lining sections corresponding to that being fused together by the welding head 28. A curved tube 31 is carried by a block 32 and is adapted to be inserted into the abutted lining sections through the hole 23 therein to carry the gas to the desired point within the lining. The end of the curved tube 31 inserted into the lining sections carries a tubular member 33 which has a semi-spheroidal ball 34 formed on the portion thereof protruding from the tube 31. The tubular member 33 has a central aperture 35 formed therein and is secured to the tube 31 by a set screw 36. A socket 37 is carried by the tubular member 33 by engaging with the ball 34. A cover plate 39 is secured to the socket 37 to retain it upon the ball 34 and to form a chamber 40 connecting to the aperture 35, while a spring 41 is positioned between the ball 34 and the cover plate 39 to maintain the ball 34 and socket 37 in air-tight connection, although permitting relative movement between the socket 37 and the ball. A tubular nozzle, or burner 42 is secured to the socket 37 and connects to the central aperture 35 whereby a gas fed to the tube 31 flows from the burner 42 and the heat produced by the welding head ignites the gas if it is combustible. The burner 42 extends substantially to the circumference of the lining sections and the socket 37 has a weight 43 secured thereto in order to retain the burner 42 in a vertical position even though the tube 31 is moved from the vertical. The curved tube 31 positions the burner 42 in the plane of abutment of the lining sections with the ball 34 on the axis of the lining sections. Thus, when the barrel sections are rotated, the tube 31 and ball 34 rotate with the lining sections but the burner 42 and socket 37 are retained in a vertical position adjacent the welding head 28 by the weight 43. Figure 3 indicates one position of the burner 42 relative to the tube 31, while Figure 2 indicates another position of the burner after rotation of the lining sections has occurred.

In order to mount the burner mechanism, blocks 48 and 49 are secured to adjoining portions of adjacent pads 17 (Figure 4). The block 48 has a substantially C-shaped passage 51 formed therein while each of the blocks has a bolt 52 extending outwardly therefrom. A flexible conduit 53 engages with the outer end of the chamber 51 with relation to the adjacent blocks 48 and 49 and connects to a suitable source of a non-oxidizing gas. The block 32 which carries the burner mechanism has slots 32a formed therein which engage with the bolts 52 when the tube 31 is mounted in the lining sections and nuts 55 are screwed down upon the block 32 to retain it in such position. A connecting passageway 56 is formed in the block 32 to lead gas from chamber 51 in the block 48 to the bore of the curved tube 31. A rubber bushing 54 is provided in the inner end of the chamber 51 to seal the joint between it and the passageway 56. This construction facilitates securing the tube 31 rapidly in position in the lining sections. Since the burner 42 is retained in a vertical position, tilting the lining section formed by fusing the sections together brings the burner and tube 31 into contact and permits insertion or withdrawal of the burner and weight into or from the lining section.

It may be desirable to exert a compressive pressure upon the lining sections after they are fused together. To this end a roller 61 is carried by an arm 62 that is pivotally secured to support 63 adjacent the rear of the welding apparatus. The roller 61 is brought to bear upon the lining sections by toggle links 64 and 65, the position of which is controlled by a lever arm 66. This arm connects to a shaft 67 which carries the toggle link 65. This compressive pressure compensates for shrinkage occurring upon cooling after the abutted lining sections are fused together and substantially eliminates formation of cracks or fissures in the fused section.

By practicing the invention, excessive oxidation of the heated surfaces, as they are fused together, is prevented. This insures production of a lasting water and air-tight joint, which is easily polished so that the container formed may carry foodstuffs without contamination.

In accordance with the patent statutes, I have illustrated and described the principle and operation of an embodiment of the invention. However, it will be understood that various modifications can be made without departing from the scope of the invention as defined in the appended claims.

What is claimed is:

1. In welding apparatus for uniting two abutted sections of a hollow, metallic vessel by a circumferential seam, one of the sections having an aperture therein, the combination of a hollow tube adapted to be inserted into the hollow, metallic vessel, a tubular member secured to the end of said hollow tube and having a semi-spheroidal ball formed on its end, a socket carried by said ball, a cover plate secured to said socket and forming an aperture therewith connecting to the bore of said tubular member, a spring positioned between said cover plate and said ball to maintain said ball and socket in tight fit, a tubular burner carried by said socket and connecting to the central aperture therein, and means secured to said socket to retain said tubular burner in a fixed, vertical position regardless of movement of said hollow tube.

2. In welding apparatus for uniting two abutted sections of a hollow, metallic vessel by a circumferential seam, one section having an aperture therein, the combination of curved tubular means one end of which is adapted to be inserted into the hollow, metallic vessel through the aperture therein, a ball and socket connection carried by the end of said tubular means inserted into the hollow, metallic vessel, burner means carried by said ball and socket connection and being movable relative to said tubular means, and means associated with said burner means for retaining it in a vertical position whereby said burner means can be made to coincide substantially with said tubular means to facilitate insertion and withdrawal of said tubular and burner means relative to the hollow, metallic vessel.

3. Barrel shell welding apparatus comprising supporting means for engaging closed end sections of a barrel shell and positioning them in abutting alignment, the abutting surface being in a plane perpendicular to the longitudinal axis of the barrel shell, means for rotating said supporting means and any barrel shell held thereby around its longitudinal axis, welding means associated with the barrel shell immediately adjacent one portion of the abutting surfaces of the barrel shell sections, tubular means adapted to rotate with the barrel shell sections extending into the barrel shell through a hole therein removed from the longitudinal axis thereof, burner means pivotally carried by said tubular means and extending to a point adjacent the abutted barrel shell surfaces, means associated with said burner means to retain the end of said burner adjacent the portion of the abutted barrel shell having said welding means associated therewith even though the barrel shell is rotated, and means supplying said tubular means with hydrogen whereby said burner means can maintain a reducing flame on the inner surface of the portion of the barrel shell being welded together.

4. Barrel shell welding apparatus comprising supporting means for engaging the sections of a barrel shell and positioning them in abutting alignment, means for rotating said supporting means and any barrel shell held thereby, welding means associated with the barrel shell adjacent one portion of the abutting surfaces of the barrel shell sections, tubular means extending into the barrel shell, nozzle means pivotally carried by and connected to said tubular means and extending to a point adjacent the abutted barrel shell surfaces, weights associated with said nozzle means to retain the end thereof adjacent the portion of the abutted barrel shell having said welding means associated therewith even though the barrel shell is rotated, and means supplying said tubular means with a non-oxidizable gas.

5. In welding apparatus for uniting two abutted sections, one of which has a hole through the side thereof, of a hollow metallic vessel by a circumferential seam, the combination of means extending through the hole in the vessel section into the vessel's interior, burner means pivotally carried by said means, and means for retaining said burner means in a predetermined vertical position while the sections are rotated to form a circumferential seam therebetween.

6. In welding apparatus for uniting two abutted sections, one of which has a hole through the side thereof, of a hollow metallic vessel by a circumferential seam, the combination of stationarily positioned welding means, means for rotating the abutted vessel sections with relation to said welding means, tubular means extending into the vessel through the hole in the side thereof, burner means pivotally carried by the portion of said tubular means within the vessel, and means associated with said burner means for retaining it adjacent said welding means regardless of the rotative position of the vessel.

7. In container welding apparatus where the container is formed from two cupped sections one of which has a hole through a side thereof, rotatable means for securing two semi-container sections in contacting alignment to form a container and rotating the container around its longitudinal axis, welding means stationarily positioned adjacent the container in the plane of the contacting surfaces, means inserted into the container through the hole in the side of one of said sections for directing a non-oxidizable gas against the inner surface of the container adjacent said welding means whereby scale and oxide formation during welding can be retarded, and further means associated with said last-named means for retaining said means adjacent the portion of said container adjacent said welding means as said container is rotated by said rotatable means.

8. That method of uniting two abutted cup-shaped container sections, one of which has a hole through its side spaced from its edge, by a circumferential seam formed at the edges of the sections, including use of a burner mechanism, having a supporting arm pivotally associated therewith, which can be brought into substantially superimposed relation with the supporting arm and drawn through the hole in the container sections, said method comprising aligning the burner mechanism and supporting arm and inserting them into the abutted container sections through the hole in the side of one section, weight means for retaining the burner mechanism in a given vertical position regardless of the position of the supporting arm also being inserted into the container sections with the burner mechanism, positioning the container sections so that the burner mechanism is in the plane of the edges of the sections, rotating the sections, securing the sections together by stationarily positioned welding means to form a container, the weight means retaining the burner mechanism adjacent the welding means to enable a non-oxidizing gas to be played on the abutted container edges as they are secured together, tilting the container to bring the burner means and supporting arm into substantially superimposed relation, and withdrawing the superimposed burner means and supporting arm through the hole in the container.

ARCHIBALD M. BROWN.